United States Patent [19]
Scuricini

[11] Patent Number: 4,543,463
[45] Date of Patent: Sep. 24, 1985

[54] METHOD AND APPARATUS FOR DYNAMIC BALANCING OF ROTATING BODIES

[75] Inventor: Giovan B. Scuricini, Rome, Italy

[73] Assignee: Comitato Nazionale per l'Energia Nucleare, Italy

[21] Appl. No.: 288,326

[22] Filed: Jul. 30, 1981

[30] Foreign Application Priority Data

Aug. 8, 1981 [IT] Italy ................... 49453 A/80

[51] Int. Cl.[4] ................ F16F 15/22; B23K 26/00
[52] U.S. Cl. .................... 219/121 LH; 74/573 R
[58] Field of Search ............ 74/573 R; 73/468, 462, 73/66; 219/121 LH, 121 LJ, 121 EJ, 121 EK, 121 PD, 121 PE

[56] References Cited

U.S. PATENT DOCUMENTS

| | | | |
|---|---|---|---|
| 3,663,795 | 5/1972 | Myer | 219/121 LH |
| 3,755,646 | 10/1973 | Muller | 219/121 LH |
| 4,028,524 | 6/1977 | Moll et al. | 73/462 |
| 4,037,076 | 7/1977 | Blackaby | 219/121 LH |
| 4,096,988 | 6/1978 | Scuricini | 74/573 R |
| 4,255,163 | 3/1981 | Sonderegger et al. | 74/573 F |
| 4,292,769 | 10/1981 | Maag et al. | 74/573 R |

FOREIGN PATENT DOCUMENTS

| | | | |
|---|---|---|---|
| 604064 | 9/1934 | Fed. Rep. of Germany | 73/468 |
| 49878 | 4/1977 | Japan | 219/121 LH |

*Primary Examiner*—Kenneth J. Dorner
*Attorney, Agent, or Firm*—Hopgood, Calimafde, Kalil, Blaustein & Judlowe

[57] ABSTRACT

A method and apparatus for the dynamic balancing of a rotating body, wherein driving signals are obtained through processing of signals detected by sensors as a function of the vibrations of the rotating body. A device for varying the mass of the body is maintained in synchronous rotation with respect to the rotating body itself; the driving signals are used to control the phase of rotation phase of the mass varying device with respect to the rotation phase of the rotating body in order to actuate the device.

15 Claims, 3 Drawing Figures

METHOD AND APPARATUS FOR DYNAMIC BALANCING OF ROTATING BODIES

BACKGROUND OF THE INVENTION

This invention relates to a method and apparatus for carrying out the dynamic balancing of bodies rotating at any speed; the invention is particularly suitable for automatic dynamic balancing of centrifuges, turbine rotors, wheels and discs.

As it is known, bodies meant to rotate, particularly at high speeds, must not display mass unbalances which would cause, during rotation and operation, vibrations which are risky and dangerous to the physical integrity of the body and to the machine on which it is mounted. In order to achieve the uniformity of structure and the tolerances of mass necessary in order to avoid the above mentioned vibrations, the bodies in discussion should therefore be worked and manufactured with extremely high precision, which often is technologically difficult.

It has therefore been necessary, once the body has been manufactured, to successively utilize static or dynamic balancing technologies in order to modify the body mass at such points and to such extent to eliminate the cause of said vibrations.

According to a previous invention by the same Assignee (U.S. Pat. No. 4,096,988) a method and apparatus are provided by means of which balancing may be carried out during operating conditions, i.e. while the body is rotating, that is without the necessity for it to be stopped, in contrast with the usually long and costly balancing procedures. According to the prior invention, which refers particularly to the balancing of rotating bodies at high speeds which during rotation are subject to deformation, the means for carrying out the balancing may be formed by several operating members capable of removing from the rotating body, by means of fusion or sublimation, or by applying on it in predetermined positions, predetermined quantities of material. However, these means are placed in a fixed position with respect to the rotating body and come into operation in coincidence with action positions of the body and for such periods which, by means of addition or removal of material vary the mass of the rotating body in the amount determined to obtain the balance. By way of a non limiting example, it was suggested to use a laser as the operating member, which permitted the addition of energy even in a vacuum and reduced the time of intervention to extremely low values.

However, in the practical application of the above described method it became apparent that the necessary characteristics of the laser made it extremely expensive, and at any rate extremely difficult to find. Lasers commercially available have extremely short impulse durations, on the order of a nano-second or a pico-second, and therefore in order to obtain the desired effect the above described method of removal of material, that is of balancing, a laser with extremely high peak power, which is very expensive, would be necessary. Lasers of a lower price and capable of operating within parameters (periods in the order of the micro-seconds, energies in the order of tenths of Joules) suitable for carrying out the method do not exist.

SUMMARY OF THE INVENTION

It is therefore the object of this invention to eliminate the above mentioned drawbacks of the prior art, therefore significantly reducing the costs of the equipment and thereby extending the range of application to other less advanced fields of technology, wherein the need is felt to automate the method as much as possible.

This invention, though maintaining the above mentioned fundamental advantage of allowing balancing in real operating conditions of the rotating body, that is without the body needing to be stopped, allows the use of an operating member such as a laser which is commonly available on the market.

The invention resides in causing the operating member to have a nul relative speed with respect to the surface of the rotating body on which it must operate. In this way, the time in which the operating member is operated in order to carry out the variation of mass of the body balanced is no longer a critical factor, and may be therefore increased to any desired extent. With an increase in the duration of the laser impulse it is possible to reduce the power required. In this it is possible therefore to employ readily accessible modulated continuous lasers.

However, especially in the case of bodies that rotate at less than extremely high speeds it will be possible to revert to operating members which are more economical than a laser, such as electronic canons and electric discharge devices (which are material removal operators) or as ionisation devices, plasma jet devices, molecular beam devices and melted material projection metallisation devices (which are material adding operators); these operating members also may be of the low power type (and therefore more economic). This is because they may function, in the method according to the invention, for any length of time whatsoever.

The invention may be put into practice with the various technical solutions which will be utilized in view of the characteristics of the rotating body.

However, the process according to the invention, wherein vibrations of the rotating body are detected in coincidentally at least one area thereof, so as to produce vibration signals which are processed in order to obtain driving signals, is characterised in that it comprises the steps of: placing in synchronous rotation, with respect to the rotating body, means capable of varying the mass of the rotating body; and actuating by said driving signals and to the extent determined thereby means for, controlling the phase rotation of the means which vary the mass of the rotating body, with respect to the phase of rotation of the rotating body.

The apparatus for carrying out the process according to the invention, in which sensing means coincidentally detect the vibrations of the rotating body at least one area thereof, to produce vibration signals which are processed in order to obtain driving signals, is characterised in that it comprises: means for placing in synchronous rotation, with respect to the rotating body, supporting means; means for varying the mass of the rotating body, rotating together with said support means; means for varying phase, in order to control the phase of rotation of said means which vary the mass of the rotating body, with respect to the phase of the rotating body; and means to actuate, to the extent determined by said driving signals, said phase varying means and said mass varying means.

These and other characteristics of the invention will be seen more clearly from the following detailed description of examplifying and non limiting embodiments thereof, with reference to the included drawings, in which.

DISCLOSURE OF THE INVENTION

Figure 1:
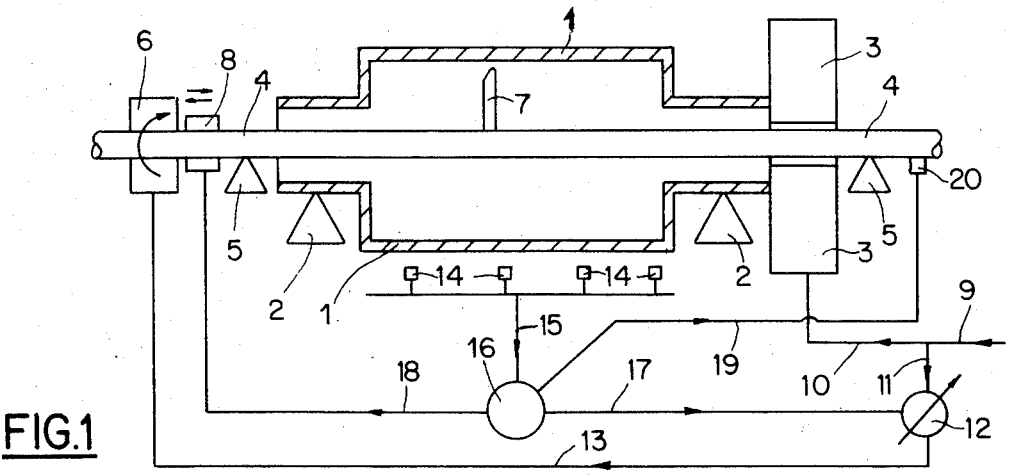
FIG. 1 is a schematic view of a first embodiment of the apparatus according to the invention, applied to a rotating tubular body shown schematically in longitudinal diametral section.

In FIG. 1 a rotating tubular body, for example the rotor of a turbine or centrifuge, caused to rotate on supports 2, around its longitudinal axis, by means of a motor 3, is indicated at 1.

On the inside of tubular body 1, on its longitudinal axis, a shaft 4 extends, is supported by supports 5 and is caused to rotate along its own axis by means of a motor 6. An operating member 7, for example a laser, is fixed to shaft 4, which may be caused to slide axially by means of a translator 8.

The electric energy supply 9 from the mains is carried through a line 10 to motor 3 and through a line 11 to a phase variator 12 which controls through a line 13 said motor 6. A number of sensors 14 (in this specific case four) are placed coincidentally at predetermined positions along rotating tubular body 1 and detect its vibrations, that is its mass unbalances at such positions; the sensors 14 are connected through a line 15 to a control member 16, connected through a line 17 phase variator 12, through a line 18 with said translator 8 and through a line 19 with an electric contact member 20 (for example, brushes) with shaft 4.

Operation of the apparatus just described is as follows. Tubular body 1 is placed in rotation, at its normal operating speed by motor 3; shaft 4 and therefore operating member 7 are brought, through motor 6, into synchronous rotation with respect to tubular body 1. Sensors 14 detect vibrations of rotating body 1, due to the excentricity of the mass of the latter (excentricities which may exist in coincidence at one or more of the sensors 14 or in coincidence at all four). The vibration signals arrive through line 15 to control member 16 which will output corresponding driving signals: member 16 through line 18 and translator 8 will thereby cause shaft 4 and operating member 7, to slide axially until the latter is brought to an axial position. For example at a position corresponding to a sensor 14; control member 16, through 17, 12 and 13, will act on motor 6 in order to vary its phase of rotation with respect to that of the motor 3, in accordance with the phase signal received by the sensor. At this point operating member 7 will be exactly and constantly pointed at the area, on the cylindrical internal surface of tubular rotating body 1, on which the mass unbalance to be eliminated is present. Through 19, 20 and an internal connection (not shown) between 20 and 7, member 16 then transmits the actuating control for operating member 7, which will remain functioning for the entire time required so that by reason of the energy which it emits a quantity of material to eliminate the unbalance is removed from the area of the surface of body 1. Such operation will then be repeated, if necessary, bringing member 7 gradually in coincidence with other possible unbalanced positions detected by sensors 14.

Control member 16 may be manual or automatic; by means of control member 16 it is possible, as it has been seen, both to determine the unbalances as well as to proceed onto balancing. If it is of the manual type, it will comprise four indicators connected to the four sensors 14 as well as manual control means to act on 8 and on 12 as a function of the readings on the four indicators. In the case where control member 16 is of the automatic type it will be possible to determine the unbalances, for example, through the method already described in the above mentioned patent which is assigned to the same Assignee.

It is obvious that the operating member 7 may be, instead of a laser, any one of the already listed operating members, both of the adding or removing type.

Figure 2:
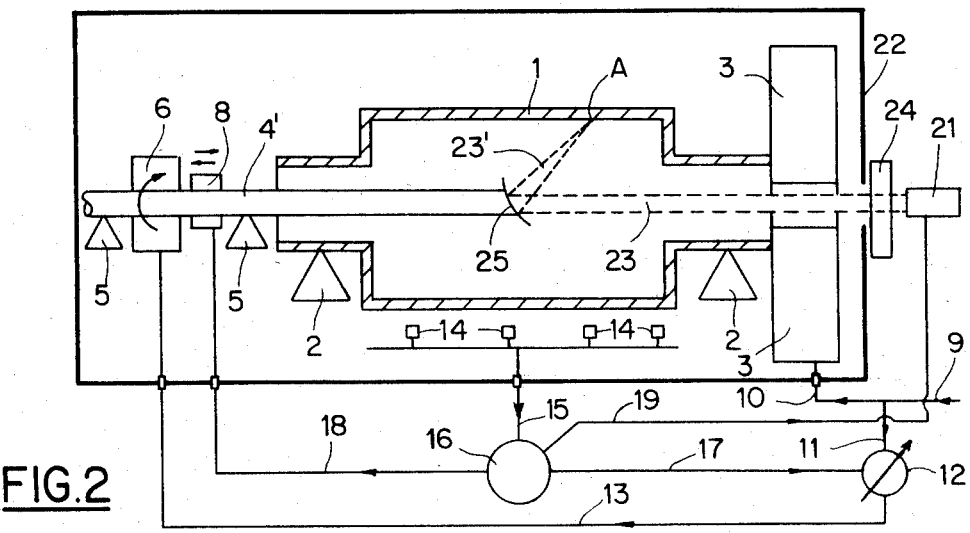
FIG. 2 is a schematic view of a second embodiment of the apparatus according to the invention, applied to a rotating tubular body shown schematically in longitudinal diametral section.

Again, in the case where a laser beam is used as the operator, the generator of said beam (laser 21 of FIG. 2) may also be placed on the outside of rotating tubular body 1 and also on the outside of a possible vacuum tight fixed housing 22 (in FIG. 2, members which are the same as those shown in FIG. 1 are indicated with the same reference numbers). In this latter case, laser 21 is fixed (i.e. no longer rotating as in the case of the previous figure) and its beam 23 enters, through a system 24 of transparent windows, the housing 22 and, axially, inside body 1. A mirror 25, fixed to the end of rotating shaft 4', inside body 1, receives laser beam 23 and reflects it (beam 23') focusing it on the area A of the internal cylindrical surface of body 1. Mirror 25 is caused to rotate, through shaft 4', synchronously with respect to the tubular body 1, and therefore synchronous rotation of the reflected beam 23' is obtained with respect to body 1. The connection between control member 16 and the laser 21 for transmission of operating controls to the latter is indicated by 19'. As for the rest, operation of the apparatus according to FIG. 2 is substantially the same as that already described with respect to FIG. 1.

Figure 3:
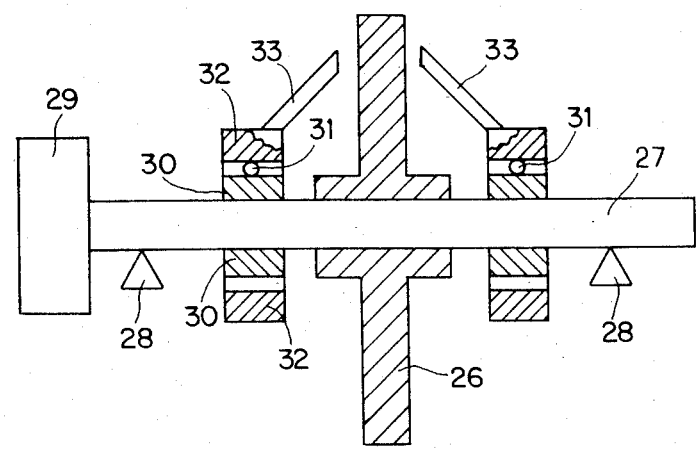
FIG. 3 is a partial schematic view of a third embodiment of the apparatus according to the invention, applied to a rotating disc shown schematically in diametral section.

In FIG. 3, 26 indicates a rotating body the shape of which is a circular disc, which is to be balanced. As an operating member, a laser will be employed only in particular cases, where special accuracy requirements are present. In general, the operating member may be a system much more economical than a laser, such as an electrical discharge device, a plasma jet device, a melted material projecting metallization device, etc. Body 26 is keyed onto a shaft 27, mounted on supports 28 and caused to rotate through a motor 29. On each side of body 26 a toothed collet 30, fixed onto shaft 27, is in engagement with a worm screw 31 carried by a bushing 32 and which rotates by means of a servoelectric motor (not shown). Bushing 32 carries operating member 33. In FIG. 3, for simplicity, the remaining parts of the apparatus have not been shown, that is the vibration sensors, the control member which receives signals therefrom and transmits some to the servomotors of the worm screws 31 and to operating members 33, as well as the relative electrical connections. It is clear that with the arrangement illustrated, the operating members 33 will be put into synchronous rotation with respect to body 26 and that the phase variator is in this case formed by the worm screw 31 which will vary the phase of rotation, that is the angular position of bushing 32 with respect to collet 30 and therefore of shaft 27 and body 26. The above mentioned control member may be built in a very simple way, according to well known techniques of analogue balancing machines, and directly provides the controls for positioning and the degree of intervention for operating members 33. Since it is not necessary to stop body 26 in order to proceed with the balancing operation, the latter may also be repeated rapidly for a large number of times, which permits proceeding by experiment with relatively unsophisticated control systems.

The phase variator may be built in several different arrangements: we have already seen the completely electrical arrangement of FIGS. 1 and 2 (two electric motors 3 and 6) and the arrangement according to FIG. 3 having an electric motor 29 and an electromechanical variator (worm screw 31 and related servomotor). By way of example, another solution is also possible (not shown in the drawings), together with the electric motor 29; on shaft 27 a cylindrical body may be keyed having an external groove, for example a helical groove; on the body a cylindrical cage is mounted which carries a sphere which engages, on one side the helical groove and on the other side a longitudinal groove of a third cylindrical body which contains the first two and which carries the operating laser member or the like. By means of any control device whatsoever, the cage may be caused to slide in the direction of the longitudinal axis, and then the sphere, which is as stated, in engagement with both grooves, will cause the desired variation of angular position of the operating member with respect to body 26. It is clear that such phase vibration systems may be applied to FIGS. 1 and 2 as well. It is equally clear that in case balancing of body 26 is to take place on only one of its faces, only one assembly of members 30 to 33 will be sufficient.

In case of extremely large series production of the body to be balanced, the latter may be built in order make the operation of balancing easier, that is it may be equipped, for example, with cavities (where the material may be deposited in order to obtain balancing, and such material may be formed by appropriate plastic material) or with appendixes (which may be easily removed by means of the operating member).

It is clear that in the case where the balancing must take place instead of on the internal surface of a rotating body (as in FIGS. 1 and 2) on its external surface (the case for example of a full body), the laser operating member, or the like, will be mounted on a support which is external to the body to be balanced and will be maintained in synchronous rotation with respect to the latter by means of any system whatsoever of transmission of movement, with the interposition of an adequate phase variator.

In the case of FIG. 2, the longitudinal movement of the zone in which the beam 23' is to act may be carried out, instead of by means of the described axial sliding of mirror 25 by means of translator 8 through a mirror which may rotate (around an axis perpendicular to the plane of FIG. 2) and the related system controlling such rotation; it is obvious that this solution may be employed only if the focus, in such a case generally poor, of beam 23' on the internal surface of body 1, is still considered sufficient for the application in consideration.

Another variation with respect to FIG. 2 includes the use of optical fibers: the end of shaft 4' inside the body 1, instead of carrying a mirror, is subdivided in a certain number of circular sectors, for example four; each of these forms the entrance for a group of optical fibers which extends on the inside of shaft 4' to a related exit provided with a collimator; shaft 4' therefore carries four exits of optical fibers in axial positions which are different and predetermined (in some cases, this may be the required operative situation). Laser beam 23 may be sent in one of the sectors by means of movement of the beam or of the optical fibers or through adequate optical means, and the same technique applies to the other sectors, and it will therefore operate in succession on the corresponding four predetermined zones, on the inside surface of rotating body 1.

The advantages of the process of the apparatus according to the invention are evident: the operation of balancing, instead of by impulses may be carried out in a continuous way; this results in that the power required by the laser, or other, operating member may be greatly reduced. Because the energy may be provided, instead of in brief periods (for example of the order of the micro second) for periods as long as desired, which may be determined on the grounds of the characteristics of the material to be removed or added for balancing (thermal conductivity, melting or vaporisation heat, thickness, etc.). The operation, being continuous, permits the following of the process of balancing, making the related manual or automatic control increasingly easy. Thus, the possibility exists of visually following (with any whatsoever member of visual presentation), and for as long as desired, the process of the balancing. This is particularly useful in the case of bodies to be belanced which are very expensive, for which the operation of balancing which turns out wrong (for example, due to the critical state of the previously mentioned system of the previous patent of the same Assignee) would mean damaging the body itself.

It is obvious that, in addition to those illustrated, several other modifications and variations may be brought to the above illustrated exemplifying forms of embodiment of the present invention, without departing from its scope. It is intended that all such variations and modifications fall within the scope of the invention itself.

What is claimed is:

1. A method for dynamically balancing a rotating hollow body, wherein the vibrations of the rotating body are coincidentally detected at at least one zone thereof, so as to produce vibration signals which are processed in order to obtain driving signals, the method comprising the steps of: placing in synchronous rotation within the hollow rotating body means for varying the mass of the rotating body; actuating means for synchronizing the phase of rotation of said mass varying means to the phase of rotation of the rotating body, said synchronizing means being actuated to the extent determined by said driving signals and sliding said mass varying means along the longitudinal axis of said hollow rotating body to permit said mass varying means to act on various planes of said body along the longitudinal axis thereof.

2. The method according to claim 1, wherein said means for varying the mass of said rotating body comprise means which emit electromagnetic energy, in order to vary the mass of said rotating body by removal of material therefrom.

3. The method according to claim 1, wherein said means for varying the mass of said rotating body comprise means which emit electrons, in order to vary the mass of said rotating body by removal of material therefrom.

4. The method according to claim 1, wherein said means for varying the mass of said rotating body comprise means which supply at least one of ions and ionised molecules, in order to vary the mass of said rotating body by means of addition of material thereto.

5. The method according to claim 1, wherein said means for varying the mass of said rotating body are formed by a beam of electromagnetic energy, which is emitted from a fixed supplying member, said beam entering axially the inside of said rotating body, said beam being directed on the internal surface of the body and caused to rotate synchronously with respect to said body through rotating optical means, placed within said body, said beam varying the mass of the rotating body through removal of material therefrom.

6. Apparatus for dynamically balancing a rotating hollow body, in which sensing means coincidentally detect the vibrations of said rotating body at at least one zone thereof, so as to produce vibration signals which are processed in order to obtain driving signals, the improvement comprising: means for placing in synchronous rotation shaft means with said hollow rotating body; means for varying the mass of said rotating body, rotating together with said shaft means; phase variation means for controlling the phase of rotation of said mass varying means in synchronization with the phase of rotation of said rotating body; means for actuating in accordance with said driving signals said phase varying means and said mass varying means; and translation means for displacing said shaft and said mass varying means along the longitudinal axis of said hollow body to permit said mass varying means to act on various planes of said body along the longitudinal axis thereof.

7. The apparatus according to claim 6, wherein said means for varying the mass of said rotating body comprise a laser device, fixed to said support means.

8. The apparatus according to claim 6, wherein said means for varying the mass of said rotating body comprise an electronic cannon fixed to said support means.

9. The apparatus according to claim 6, wherein said means for varying the mass of said rotating body comprise an electric discharge device, fixed to said support means.

10. The apparatus according to claim 6, wherein said means for varying the mass of said rotating body comprise an ionisation device, fixed to said support means.

11. The apparatus according to claim 6, wherein said means for varying the mass of said rotating body comprise a plasma jet device, fixed to said support means.

12. The apparatus according to claim 6, wherein said means for varying the mass of said rotating body comprise a molecular beam device, fixed to said support means.

13. The apparatus according to claim 6, wherein said means for varying the mass of said rotating body comprise a melted material projecting and metallization device, fixed to said support means.

14. The apparatus according to claim 6, wherein said means for varying the mass of said rotating body are formed by a beam of electromagnetic energy which is emitted by a fixed supplying member, said beam entering axially the inside of said rotating body and is directed onto the internal surface of said body and caused to rotate synchronously with respect to said body by optical means, said optical means being carried by said support means which extend axially within said body.

15. The apparatus according to claim 14 wherein said optical means comprise reflector means.

* * * * *